(12) United States Patent
D'eu et al.

(10) Patent No.: US 8,269,500 B2
(45) Date of Patent: Sep. 18, 2012

(54) GEOPHYSICAL MEASUREMENT DEVICE FOR NATURAL SOIL RESOURCE EXPLORATION IN AQUATIC ENVIRONMENT

(75) Inventors: Jean-François D'eu, Lanildut (FR); Graeme Cairns, Ottawa (CA); Pascal Tarits, Guilers (FR); Marion Jegen-Kulcsar, Leverkusen (DE); Alain Dubreule, Saint Renan (FR)

(73) Assignees: Universite de Bretagne Occidentale, Brest Cedex (FR); Centre National de la Recherche Scientifique (CNRS), Paris Cedex (FR)

( * ) Notice: Subject to any disclaimer, the term of this patent is extended or adjusted under 35 U.S.C. 154(b) by 686 days.

(21) Appl. No.: 12/160,347

(22) PCT Filed: Jan. 9, 2007

(86) PCT No.: PCT/EP2007/050192
§ 371 (c)(1), (2), (4) Date: Aug. 4, 2009

(87) PCT Pub. No.: WO2007/080167
PCT Pub. Date: Jul. 19, 2007

(65) Prior Publication Data
US 2011/0031973 A1 Feb. 10, 2011

(30) Foreign Application Priority Data
Jan. 9, 2006 (FR) ...................................... 06 00171

(51) Int. Cl.
*G01V 3/00* (2006.01)

(52) U.S. Cl. ........................................ 324/345; 324/350
(58) Field of Classification Search .......... 324/345–365
See application file for complete search history.

(56) References Cited

U.S. PATENT DOCUMENTS

| 5,770,945 A | * | 6/1998 | Constable | ..................... 324/350 |
| 6,512,356 B1 | * | 1/2003 | Webb | .............................. 324/72 |
| 6,958,693 B2 | * | 10/2005 | Rothgeb et al. | .......... 340/539.22 |

FOREIGN PATENT DOCUMENTS
WO 03104844 A1 12/2003

OTHER PUBLICATIONS

Tyce R. et al, "Trawl-Safe Profiler Development at SACLANT Centre for Shallow Water Environmental Assessment and Real Time Modelling". Oceans 2000, MTS/IEEE Conference and Exhibition, Sep. 11-14, 2000, Piscataway, NJ, USA, IEEE, vol. 1, (Sep. 11, 2000), pp. 99-104.

(Continued)

*Primary Examiner* — Arleen M Vazquez
(74) *Attorney, Agent, or Firm* — David D. Brush; Westman, Champlin & Kelly, P.A.

(57) ABSTRACT

A geophysical measurement device is provided for exploration of natural resources of the floor in an aquatic domain. The device includes a frame designed to rest in a stable manner on the floor of the aquatic environment, at least one buoyancy caisson resting on the frame, measurement instruments. The measurement instruments including: at least one sensor making it possible to measure locally at least one of the components of the magnetic field; an analogue and/or digital data acquisition and processing device; and a source of energy supply of the sensor and of the data acquisition and processing device. The at least one sensor is contained inside the buoyancy caisson.

12 Claims, 4 Drawing Sheets

OTHER PUBLICATIONS

Earl Marshall D et al, "Hand-Depoloyable Wave Buoy Utilizing Triaxial Accelerometer, Angular Rate, and Magnetometer Sensors", & Proc Int Symp Ocean Wave Meas Anal; Proceedings of the International Symposium on Ocean Wave Measurement and Analysis 1998 ASCE, Reston, Va, USA (Nov. 3, 1997), pp. 1213-1226.

International Search Report of Counterpart Application No. PCT/EP2007/050192 Filed on Jan. 9, 2007.

French Search Report of Counterpart Application No. 06/00171 Filed on Jan. 9, 2006.

* cited by examiner

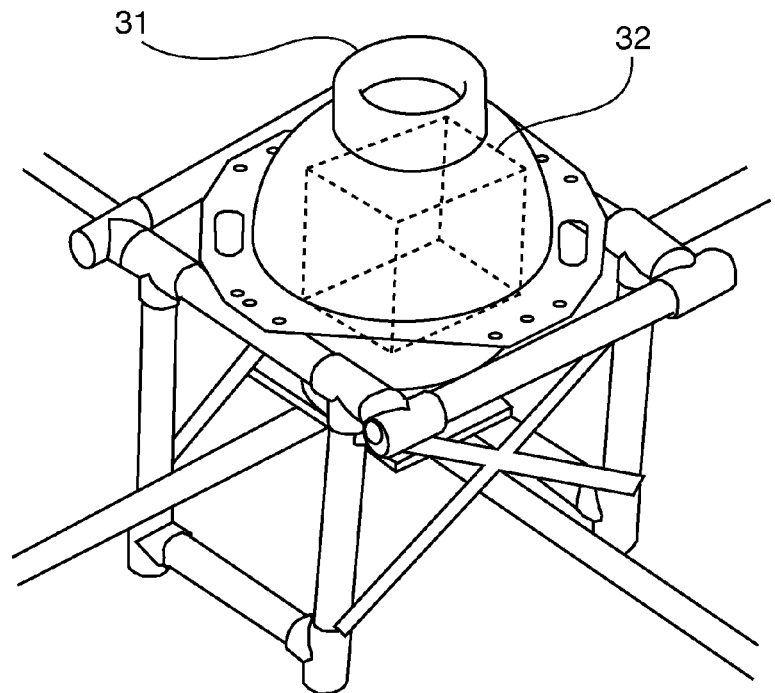
Fig. 3
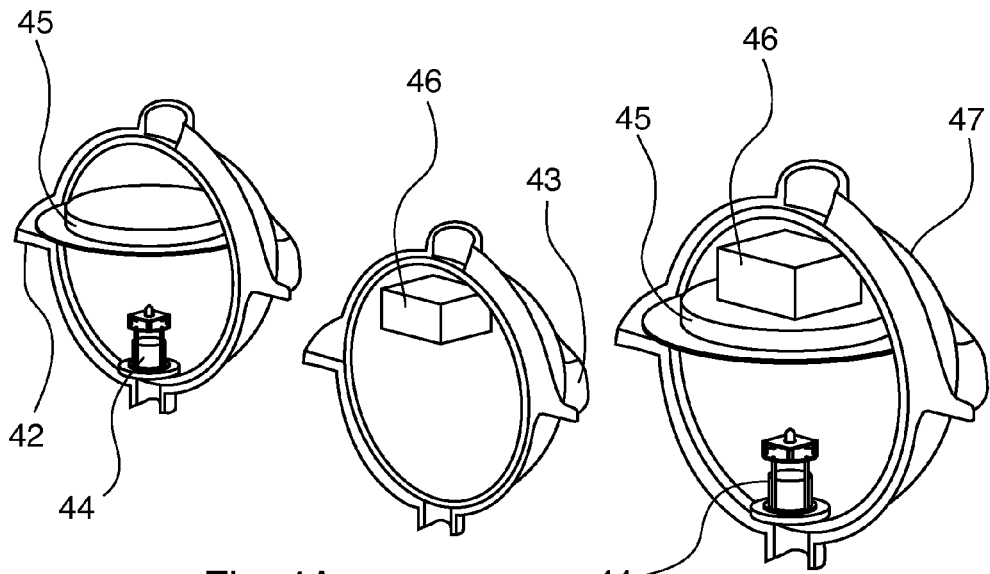
Fig. 4A
Fig. 4B

GEOPHYSICAL MEASUREMENT DEVICE FOR NATURAL SOIL RESOURCE EXPLORATION IN AQUATIC ENVIRONMENT

CROSS-REFERENCE TO RELATED APPLICATIONS

This Application is a Section 371 National Stage Application of International Application No. PCT/EP2007/050192, filed Jan. 9, 2007 and published as WO 2007/080167A1 on Jul. 19, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the exploration of the geophysical properties of the subsoil of an aquatic environment.

More specifically, the disclosure relates to a measurement device used to define, on the basis of a magnetotelluric approach, mapping of the electrical conductivity distribution of the subsoil of such an environment, particularly in a marine environment. The disclosure is intended more specifically to be implemented within the scope of prospecting projects prior to the operation of the natural resources in the subsoil, and particularly in the location of oil and gas deposits.

BACKGROUND OF THE DISCLOSURE

It is very widely acknowledged that the natural resources in the subsoil of seas, oceans, and large lakes are potentially very significant.

However, in some cases, these resources remain undetected or unexploited due to the technical obstacles created by the presence of large depths of water.

Direct or drilling prospecting methods, which are frequent within the scope of terrestrial prospecting, clearly prove to be difficult to transfer to aquatic environments if the technical requirements and costs associated with the use of such methods are taken into consideration.

For this reason, indirect prospecting methods are generally used, making it possible to deduce the geological nature of the subsoil on the basis of the measurement of a physical value.

A first conventional indirect prospecting method for the exploration of natural subsoil resources in aquatic environments uses a measurement of the propagation of a seismic wave, obtained for example by means of the deflagration of an explosive charge under the water surface, after reflection thereof on the various strata of the subsoil of the aquatic environment. However, the interpretation of the results obtained using this method remains difficult in some geological contexts, i.e. for example in the presence of salt domes, thick basalt flows or very complex geological structures.

The current trend is thus to generalise the use of a second indirect prospecting method by means of the passive magnetotelluric measurement of the electrical conductivity of the subsoil under the stretch of water. This method is referred to as the magnetotelluric method (MT). Known and used for many years to evaluate natural resources in terrestrial subsoil, it was only recently implemented in an aquatic environment, particularly on the continental shelf in a marine environment, due to the development of data acquisition and processing means. In addition, it offers the advantage of not having any impact on the environment as it is a passive method.

The electrical conductivity of the soil varies with the mineralogical nature of the rocks, and depends among other things on the temperature and pressure. It is also very sensitive to the presence of conductive inclusions such as hydrothermal water, brine associated with oil deposits, metals and metallic salts in sulphides form for example, and also the degree of connectivity of these inclusions. In this way, a measurement of the electrical conductivity makes it possible to identify the geological units and the relative porosity of the constituent rocks.

This method uses the measurement of the natural fluctuations of horizontal geoelectric and geomagnetic fields to determine a surface impedance. This impedance, referred to as the magnetotelluric impedance, obtained on a wide range of frequencies, makes it possible therefore to determine the distribution of the electrical conductivity under the soil surface.

It is observed that, in order to obtain suitable mapping of the geographic strata in the soil, it is possible to complete the information from the electrical conductivity measurement with other interpretations based on seismic or gravimetric data.

One problem encountered with this method is that, in seawater, frequencies greater than a few thousandths of Hertz are rapidly attenuated with the distance or depth. This results in a considerable loss in the power of the electrical field or magnetic field for these frequencies. Consequently, as soon as one moves away from the surface of the seabed, it rapidly becomes impossible to make an acceptable measurement in the frequency range (0.01 to 100 Hertz) useful for the interpretation of the nature of the geographic strata.

A first solution to this problem is presented in the document U.S. Pat. No. 5,770,945. This document proposes to make a measurement of the horizontal components of the natural and magnetic fields using an autonomous instrument resting on the seabed and comprising at least two magnetic sensors.

A first drawback of this technical solution is that it only measures the horizontal components of the electric and magnetic fields, which does not make it possible to describe subsoils with complex compositions accurately.

In order to remedy this drawback, the document WO 03/104844 proposes to equip an instrument according to the document U.S. Pat. No. 5,770,945 with a vertical mast in which two electrodes intended to measure the vertical components of the electric field are placed. However, this technical solution remains difficult to perform in an appropriate manner as the vertical component of the electric field has a low intensity and is difficult to measure on the seabed. Moreover, such a measurement is necessarily disturbed by the instability of the position of the sensor.

A second drawback of the technical solution proposed by U.S. Pat. No. 5,770,945 is the sensitivity of the sensors and subsequently of the instrument to sea currents present on the seabed.

A third drawback is due to the type of sensor used, which is very bulky and heavy, which results in excessive instrument weight and size, which also makes it more sensitive to sea currents.

SUMMARY

An aspect of the disclosure relates to a geophysical measurement device for the exploration of the natural resources of soil in an aquatic environment, comprising:
- a supporting frame intended to rest in a stable manner on said soil of said aquatic environment;
- at least one floatability caisson resting on the supporting frame; and
- means forming measurement instruments comprising:
- at least one sensor used to measure locally at least one of the components of the magnetic field;
- means forming an analog and/or digital data acquisition and processing device; and
- means forming a power supply source for the sensor and for the means forming a data acquisition and processing device.

According to an embodiment of the invention, the sensor is contained inside the floatability caisson.

It should be noted that, the sensor being in the caisson, the device has a front surface that can be subjected to a lower hydrodynamic thrust force, which thus makes it possible to limit the influence of sea currents on the magnetic field measurement.

In addition, such a device generally forms a more compact assembly than a geophysical measurement device comprising at least one caisson and means forming a measurement instrument including a sensor positioned outside the floatability caisson.

Advantageously, the sensor comprises means to measure the three components of the magnetic field.

In this way, the measurement of the horizontal components and the vertical component of the magnetic field enables an accurate characterisation of subsoils with a complex composition.

In fact, the measurement of the vertical component of the magnetic field is particularly satisfactory, as the vertical components of the magnetic field become noteworthy in the presence of significant lateral variations in the electrical conductivity, particularly in the interface zone between an electrically resistant medium and an electrically conductive medium, encountered on the surface of the soil in the seabed.

In an alternative embodiment of the invention, it should be noted that this technique consisting of measuring the three components of the magnetic field with a sensor may be used when the sensor is placed outside the floatability caisson.

According to one advantageous embodiment, such a device comprises a single floatability caisson, and also the means forming a data acquisition and processing device and the means forming a power supply source are comprised in the single floatability caisson.

In this way, the device has a generally compact appearance, which facilitates the storage, transport and use thereof.

According to an advantageous alternative embodiment of the invention, such a device comprises at least two floatability caissons, said sensor, the means forming a data acquisition and processing device and the means forming a power supply source being comprised in one of the caissons.

In this way, by placing the means forming a data acquisition and processing device and the means forming a power supply source in one of the caissons, the movements of the device induced by the sea currents are reduced, which makes it possible to improve the precision on magnetic field measurements.

According to another advantageous alternative embodiment of the invention, such a device comprises at least two floatability caissons, the sensor, the means forming a data acquisition and processing device and the means forming a power supply being distributed in at least two of the caissons.

In this way, it is possible to optimise the volume of each caisson to reduce the cumulative volume of all the caissons and therefore limit the effect of the sea currents, or improve the compact nature of the device.

Advantageously, such a device comprises an inclinometer firmly attached to the sensor.

In this way, the orientation of the magnetic sensor is known with precision, which reduces measurement uncertainty.

According to a preferential characteristic, the caisson is obtained from at least one amorphous material.

In this way, interference with the magnetic field is avoided by using magnetic or metal materials for the caisson.

According to another preferential aspect, the means forming an analog and/or digital data acquisition and processing device include induction vector component determination means.

In this way, the device is provided with means to estimate the induction vector directly and, subsequently, the electrical conductivity of the soil.

Preferentially, such a device comprises data and induction vector component transmission means to a remote receiver.

In this way, it is possible to access the values of the induction vector and the magnetotelluric impedance in real time.

Preferentially, the induction vector components are determined for at least two separate frequencies.

In this way, the distribution of the electrical conductivity under the soil surface is determined.

Advantageously, the internal volume of the caisson(s) containing said means forming measurement instruments is substantially equal to the volume of the means forming measurement instruments.

This technical solution renders the device very compact, while limiting the hydrodynamic thrust force induced by the sea currents and, consequently, the measurement uncertainties on the magnetic field.

BRIEF DESCRIPTION OF THE DRAWINGS

Other characteristics and advantages will emerge more clearly on reading the following description of a preferential embodiment of the invention, given merely as an illustrative and non-limitative example and the appended figures wherein:

FIG. 3 illustrates schematically a second embodiment of the device according to the invention;

FIGS. 4A and 4B respectively illustrate an alternative embodiment of the embodiment corresponding to FIGS. 1A and 1B, and the influence of the volume of the caisson if the device is produced according to the second embodiment of the invention;

DETAILED DESCRIPTION OF ILLUSTRATIVE EMBODIMENTS

Figure 1A:
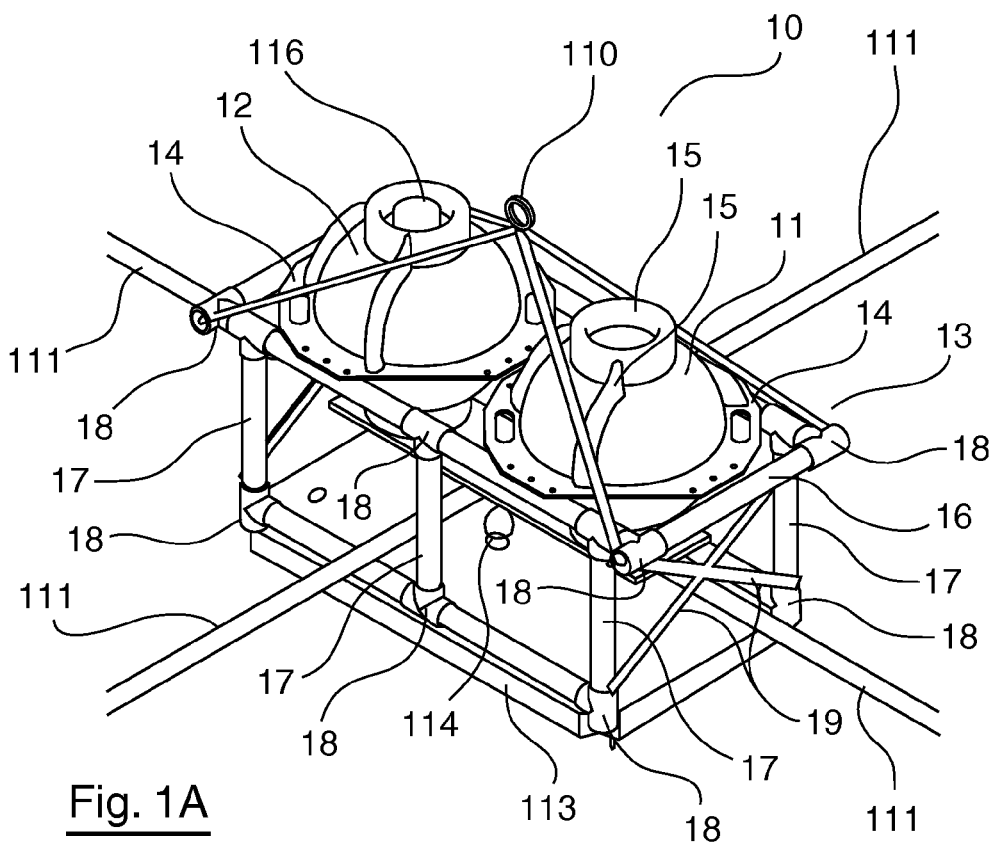
FIGS. 1A and 1B display a schematic perspective top and bottom view, respectively, of a device according to a first specific embodiment of the invention.
Figure 1B:
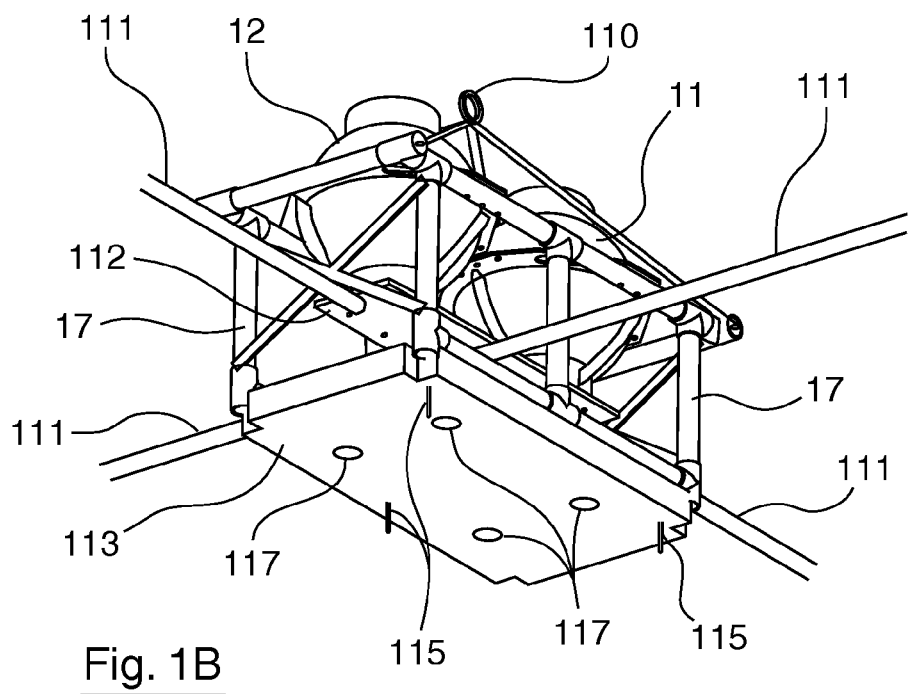

As already mentioned, an embodiment of the invention is advantageously a geophysical measurement device for the exploration of natural soil resources in an aquatic environment. The embodiment, described hereinafter, relates to a device intended in particular for deep-sea oil prospecting and comprising two floatability caissons, as illustrated in FIGS. 1A and 1B, in a top and bottom perspective view, respectively.

The geophysical measurement device 10 comprises a first floatability caisson 11, containing a magnetic sensor, also referred to as a magnetometer, and a second floatability caisson 12 mounted on a tubular structure supporting frame 13. The two watertight caissons 11 and 12 are identical in this embodiment. These caissons 11 and 12 are substantially spherical in shape overall, this specific shape enables the walls of the caisson to withstand the hydrostatic pressure up to a depth of six thousand meters. The caissons consist of a glass sphere, not represented in FIGS. 1A and 1B, wherein the outer surface is protected by two rigid plastic hemispherical half-shells in contact at a flange surface 14. Each caisson shell has rib 15 distributed homogeneously along parallel and meridian lines so as to rigidify the structure thereof while retaining acceptable wall thicknesses and weight.

So as not to interfere with the measurements, the components of the caissons are made of non-magnetic preferentially non-metallic materials, and have no trace of corrosion. In this way, the floatability caisson confinement consists of a glass sphere protected by a plastic shell.

The supporting frame 13 comprises a frame 16 whereon the caissons 11 and 12 rest and legs 17 enabling the device to rest vertically on the seabed floor. Advantageously, the supporting frame is open to water flow in order to limit the thrust forces caused by sea currents on the device. This supporting frame 13 is made of hollow tubes, preferentially made of polyvinyl chloride (PVC) or polypropylene, assembled by means of assembly cross-pieces 18 and is consolidated by bracing members 19. Advantageously, the cross-section of the supporting frame tubes is reduced, in order to limit interference caused by the effects of sea currents on the measurement sensor. Similarly, it is also possible to envisage modifying the shape of the caissons to improve their hydrodynamic profile.

A handling hook 110 for immersion, making it possible to move the device with a crane, or any other carrying device, is attached to the supporting frame 13 by straps.

Two pairs of similar polypropylene flexible pipes 111 are attached to a frame 112 attached to the caissons 11 and 12. These pairs of pipes 111 are used to pass watertight and pressure-resistant cables to non-polarising Pb—PbCl2 type electrodes, not represented in FIGS. 1A and 1B, placed at the free ends thereof. The assembly consisting of two non-polarising electrodes of the same pair of pipes 111 thus forms an electric dipole.

Advantageously, the orientation of the non-free end of the pairs of pipes corresponds or is indexed with respect to the directions of the components of the field measured in the horizontal plane by the magnetic sensor.

The cumulative volume of the floatability caissons is sufficient for the assembly consisting of the two caissons 11 and 12, the supporting frame 13 and the measuring apparatuses contained and/or attached on the caissons and/or the supporting frame can float autonomously on the water surface and rise again autonomously from the seabed.

In order to enable the lowering to the device to a sea or ocean bed, a concrete ballast 113 is attached under the supporting frame by a hook 114. This ballast 113, which is adapted to the shape of the supporting frame is provided under the base thereof with three claws 115 in order to improve the stability and anchorage of the device on the seabed floor, and is punched along reservations 117 in order to facilitate the lowering of the instrument.

The hook 114 is opened by electrolytic dissolution of an Inconel wire, which enables the device to be detached from the ballast 113 and be able to rise to the surface due to its own floatability.

The release of the ballast is controlled automatically from the surface via an acoustic transponder 116 mounted on the outer wall of the caisson 12. This transponder transmits a command to the power supply contained in the caisson 11 which applies a twelve Volt voltage between the wire and an electric ground point of the device, thus performing the dissolution of the Inconel wire by means of an electrolytic process after a few minutes.

After rising to the surface, the device according to an embodiment of the invention may be located in order to be retrieved by means of a very high frequency (VHF) beacon and Xenon type light flare.

The means forming measurement instruments, also referred to as measuring apparatuses, are described with reference to FIGS. 2A to 2C.

As described above, the caisson 11 contains a magnetic sensor 21, used to measure the value of the terrestrial magnetic field in three orthogonal directions. The sensor 21, illustrated in FIG. 2A, is preferentially a flux-valve magnetometer comprising three coils $22_1$, $22_2$ and $22_3$ oriented along three orthogonal directions powered with a twelve Volt voltage. The magnetometer 21 enables a relative measurement of the magnetic field by direct compensation of the total magnetic field on the sensor. Therefore, it has an acceptable sensitivity and dynamic response making it possible to make a satisfactory measurement of the magnetic field variations. In addition, as the total magnetic field is measured by the sensor, the orientation of the sensor is thus obtained accurately. Therefore, it is not necessary to provide a compass to determine the position of the sensor.

Moreover, the magnetometer 21 is advantageously firmly attached to a bidirectional inclinometer 23 in order to be able to obtain the inclination of the sensor accurately. In this way, no uncertainty remains on the position of the sensor 21.

Figures 2A, 2B:
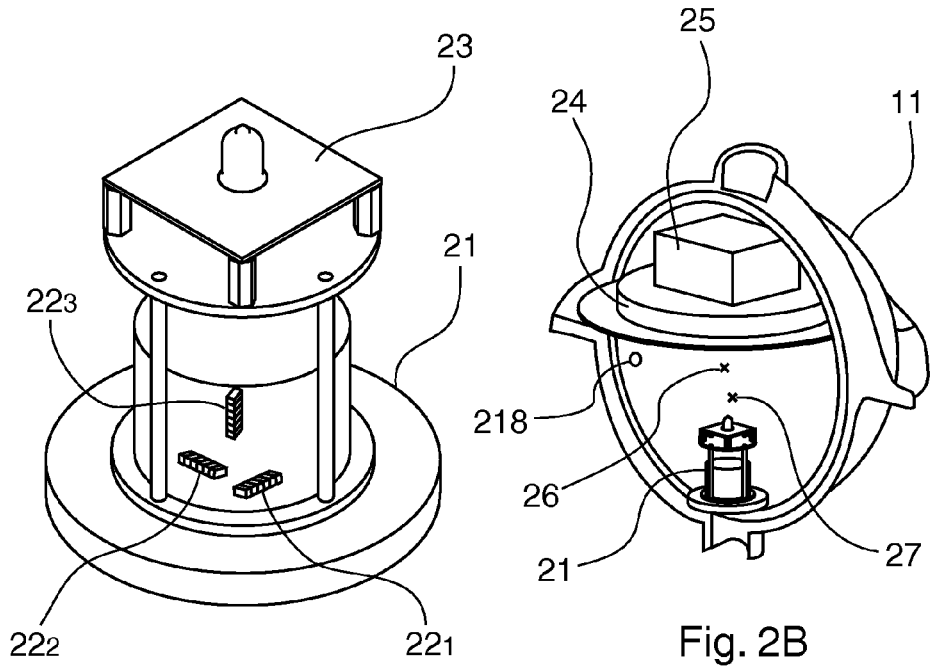
FIG. 2A is a detailed view of the magnetometer comprised in the device in FIGS. 1A and 1B.
FIGS. 2B and 2C are, respectively, a simplified view of the inside of the caisson containing the means forming the measurement instrument and a schematic representation of the data acquisition and processing system in FIGS. 1A and 1B.

The means forming an analog and/or digital data acquisition and processing device 24, or data acquisition and processing system, and the means forming a power supply source for the sensor and for the data acquisition and processing system 25, also referred to as batteries, are placed in the caisson 11 in this preferential embodiment, as illustrated in FIG. 2B. To avoid interference with the measurements, the sensor 21 was mounted away from the batteries 25.

In order to prevent the device according to an embodiment of the invention from being destabilised and turning round on itself when rising to the surface, the measuring apparatuses are placed in the caisson 11 such that the center of thrust 26 of the device is positioned above its center of gravity 27.

Figure 2C:
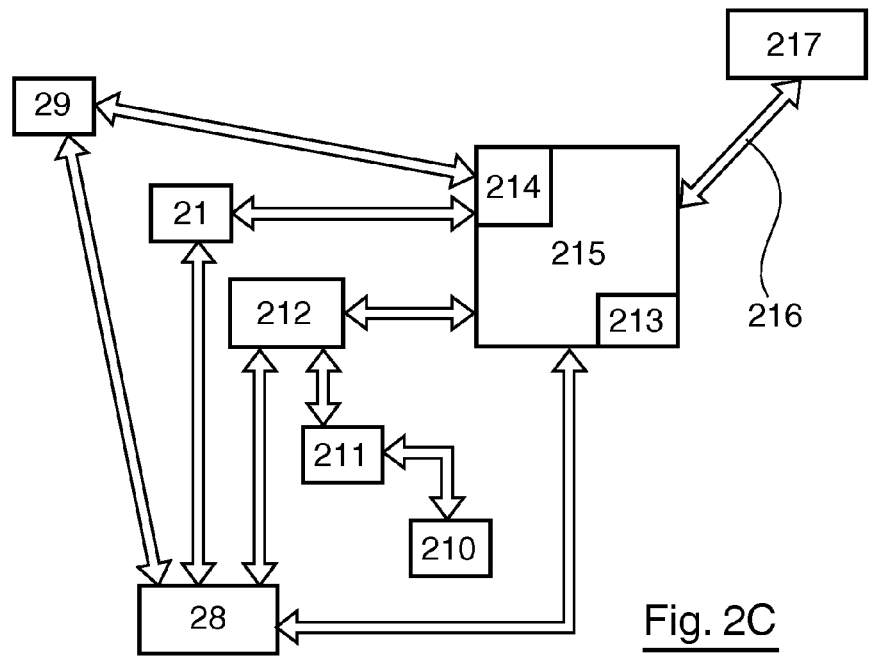

With reference to FIG. 2C, the data acquisition and processing system 24 comprises a clock 28 to synchronise the acquisition of the signals from the magnetometer and both dipoles. The clock 28 is preferentially synchronised on the Global Positioning System (GPS) time 29.

The electrodes 210 of each dipole are connected inside the caisson 11 to amplifiers 211 having a low very noise on the useable frequency band, ranging from zero to over one hundred Hertz, connected to sigma-delta type 24-bit analog-digital converters 212, to adapt to the useable frequency band.

The data acquisition process is controlled by a microprocessor 213. Said microprocessor 213 triggers the data acquisition, interacts with the clock 28 to synchronise the measurements according to the sampling frequency, and controls the acquisition card 214 used to convert the acquired signals to digital data. The microprocessor 213 also controls the digital data transfer to an electronic storage medium, for example a memory card 215 or miniature hard drive. Without leaving the scope of the invention, it may also be envisaged to transmit the digital data to the acoustic transponder 116 or any other transmission means or relay terminal communicating with the surface.

A serial link 216, produced via a bundle connected to a watertight passage via the wall of the caisson 11 makes it possible to retrieve the data stored on the medium without opening the caisson to a computer 217, when the device according to an embodiment of the invention rises to the surface. This serial link 216 may be replaced by a wireless communication means, such as a radio message, an infrared message or any other usual means.

Using the simultaneous measurement of the three components of the magnetic field by the magnetometer 21 and the horizontal components of the electric field by the electrodes 210 of the dipole for various frequencies, the microprocessor 213 may run for each of the frequencies the calculation of the tensors defining the magnetotelluric impedance, subsequently referenced $\overline{Z}$, and the induction vector, referenced $\overline{T}$. The calculation algorithm comprises a first step consisting of determining by means of a change of reference the horizontal components $B_x$ and $B_y$, and the vertical component $B_z$ of the magnetic field, on the basis of the components measured, and the horizontal components $E_x$ and $E_y$ of the electric field, and a second calculation step of the magnetotelluric impedance $\overline{Z}$, and the induction vector $\overline{T}$ on the basis of the formulations:

$E_{x,y} = \overline{Z} B_{x,y}$, $E_{x,y}$ and $B_{x,y}$ representing the vectors formed from the horizontal components of the electric and magnetic fields, respectively; and $B_z = \overline{T} B_{x,y}$.

The magnetotelluric impedance $\overline{Z}$, and the induction vector $\overline{T}$ data calculated thus provide an on-site estimation of the electric conductivity distribution of the subsoil.

The batteries 25 are preferentially a plurality of rechargeable batteries arranged in parallel, for example Li-ion type, which makes it possible to recharge the accumulators of the battery 25 without opening the caisson 11. To this end, a watertight passage 218 connected to the batteries 25 via a connection cable, represented in FIG. 2B, is provided in the wall of the caisson 11.

A second embodiment of the invention is shown in FIG. 3. In this embodiment, the device comprises a single floatability caisson 31. This technical solution is adapted to a set of measuring apparatuses 32, represented as a dotted line in FIG. 3, wherein the size is reduced and which may be contained in a caisson which is preferentially commercially available and distributed for example by the companies NAUTILUS MARINE SERVICE GmbH, Bremen, Germany or BENTHOS, North Falmouth, Mass., U.S.A. In addition, this compact solution facilitates the storage and transportation of the measurement devices. Preferentially, the internal volume of the caisson 31 is equal to the volume of the measuring apparatuses 32.

In an alternative embodiment of the invention illustrated in FIG. 4A, the measuring apparatuses 41 are distributed between two floatability caissons 42 and 43. The magnetic sensor 44 and the data acquisition and processing system 45 are in the caisson 42 and the batteries 46, which are larger in size, are contained in the second caisson 43. In this way, the influence of sea currents on the device according to an embodiment of the invention is reduced in comparison to an embodiment of the invention for which the same measurement system is placed in a single caisson 47, represented in FIG. 4B, of a necessarily greater volume than the cumulative volume of the caissons 42 and 43.

Figure 5:
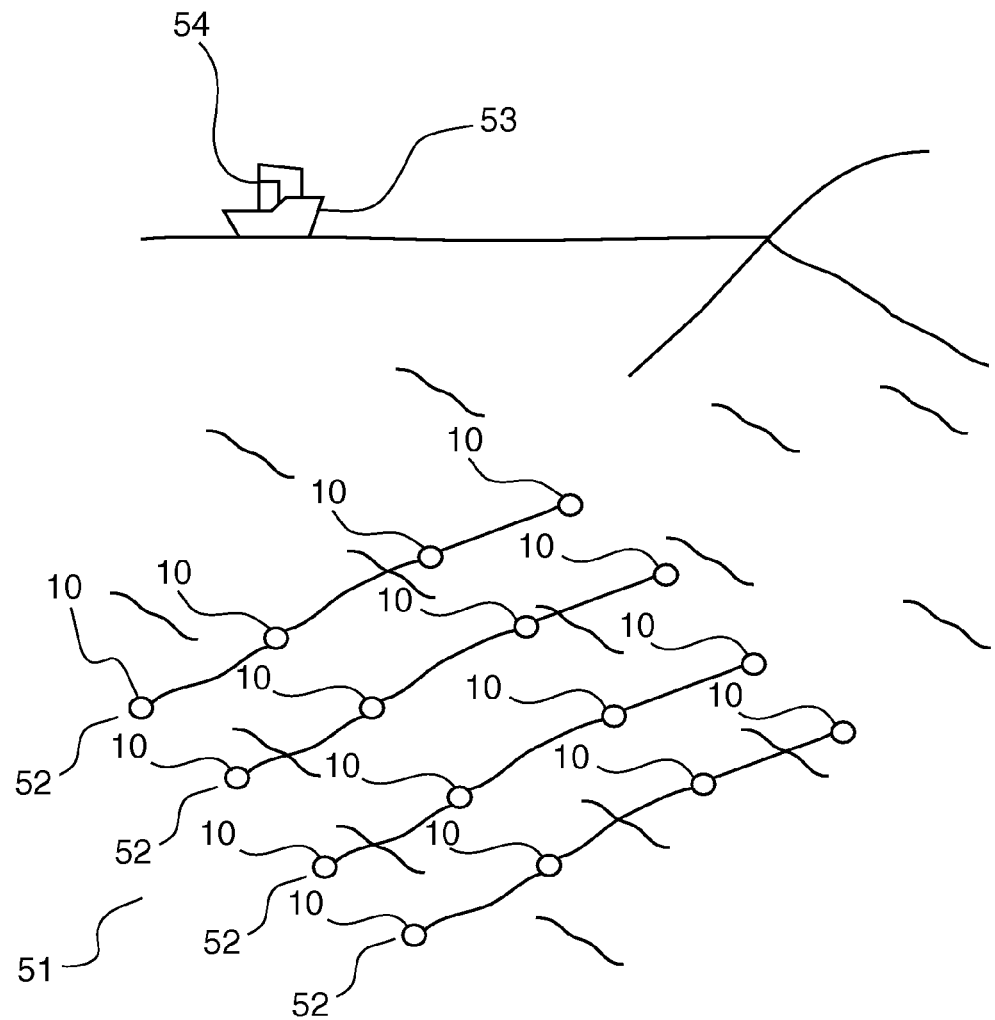
FIG. 5 is a schematic view of a mapping unit of the magnetotelluric properties of a seabed zone comprising a set of devices according to an embodiment of the invention arranged according to a substantially regular grid.

With reference to FIG. 5, an MT mapping unit 51 of a zone of the seabed comprising a set of sixteen devices 10 according to the invention is arranged in a substantially regular grid on the floor of a seabed. Naturally, the number of devices 10 of an MT mapping unit may be adapted to the surface and the relief of the prospected seabed zone. The devices 10 of a grid 52 may be connected for this purpose by thin and flexible cables and were immersed from a ship 53.

An acoustic transmitter 54 on-board the ship 53 makes it possible to communicate with the acoustic transponders 116 installed on the caisson 12 of the device 10 to trigger the rising of the unit 51 to the surface. The transponder may also transmit the data compiled by the devices 10 to the remote ship 53.

Moreover, it may be envisaged without leaving the scope of the invention to:
- attach on the supporting frame the data acquisition and processing system and the batteries in watertight confinements, outside the floatability caisson(s);
- insert in the caissons a light and inert gas such as for example helium, or argon, in order to improve the floatability of the device;
- fill the caissons with a pressurised gas in order to prevent any damage caused by the entry of water on the measurement system in the event of a caisson water tightness fault.

An embodiment of the invention provides a higher performance geophysical measurement device than the instruments according to the prior art measuring the two or three orthogonal components of the electric field and the horizontal components of the magnetic field.

In at least one specific embodiment of the invention, the device is relatively insensitive to the effects of sea currents in order to improve precision on the magnetic field measurements.

In at least one specific embodiment of the invention, a device used to evaluate on the basis of the measurement of the horizontal and vertical components of the magnetic field, the value of the induction vector which is sensitive to heterogeneous geological structures.

At least one specific embodiment provides such a technique, which is compact, light and easy to operate, in order to facilitate the implementation of the device.

At least one specific embodiment of the invention also offers an undersea apparatus autonomous in terms of data and measurement acquisition, processing and transmission, and wherein the rising to the surface may be remote-controlled.

At least one embodiment of the invention provides a suitable device for deep-sea oil prospecting, particularly in zones where the interpretation of seismic data requires additional information.

At least one specific embodiment provides a mapping unit of some magnetotelluric properties (electrical conductivity, etc.) of a subsoil zone in an aquatic environment comprising a set of devices according to an embodiment of the invention arranged according to a substantially regular grid.

Although the present disclosure has been described with reference to one or more examples, workers skilled in the art will recognize that changes may be made in form and detail without departing from the scope of the disclosure and/or the appended claims.

The invention claimed is:

1. Geophysical measurement device for exploration of natural resources of soil in an aquatic environment, comprising:
- a supporting frame intended to rest in a stable manner on said soil of said aquatic environment;
- at least one watertight floatability caisson resting on the supporting frame; and
- a measurement instrument comprising:
  - at least one magnetic sensor used to measure locally at least one of component of the magnetic field;
  - an analog and/or digital data acquisition and processing device; and
  - a power supply source for the at least one magnetic sensor and the data acquisition and processing device;
- wherein the at least one magnetic sensor is contained inside the at least one watertight floatability caisson.

2. Geophysical measurement device according to claim 1, wherein the at least one magnetic sensor comprises means for measuring three components of the magnetic field.

3. Geophysical measurement device according to claim 1, comprising a single watertight floatability caisson.

4. Geophysical measurement device according to claim 3, wherein the data acquisition and processing device and the power supply source are comprised in the single watertight floatability caisson.

5. Geophysical measurement device according to claim 1, comprising at least two watertight floatability caissons, wherein the at least one magnetic sensor, the data acquisition and processing device and the power supply source are comprised in one of the at least two watertight floatability caissons.

6. Geophysical measurement device according to claim 1, comprising at least two watertight floatability caissons, wherein the at least one magnetic sensor, the data acquisition and processing device and the power supply are distributed in at least two of the watertight floatability caissons.

7. Geophysical measurement device according to claim 1, comprising an inclinometer attached to the at least one magnetic sensor.

8. Geophysical measurement device according to claim 1, wherein the watertight floatability caisson is obtained from at least one amorphous material.

9. Geophysical measurement device according to claim 1, wherein the analog and/or digital data acquisition and processing device include means for determining an induction vector component.

10. Geophysical measurement device according to claim 9, comprising a transponder, which transmits the data and the induction vector component to a remote receiver.

11. Geophysical measurement device according to claim 9, wherein the induction vector component is determined for at least two separate frequencies.

12. Geophysical measurement device according to claim 1, wherein the at least one watertight floatability caisson has an internal volume containing the measurement instrument, which is substantially equal to the volume of the measurement instrument.

* * * * *